No. 781,375.              Patented January 31, 1905.

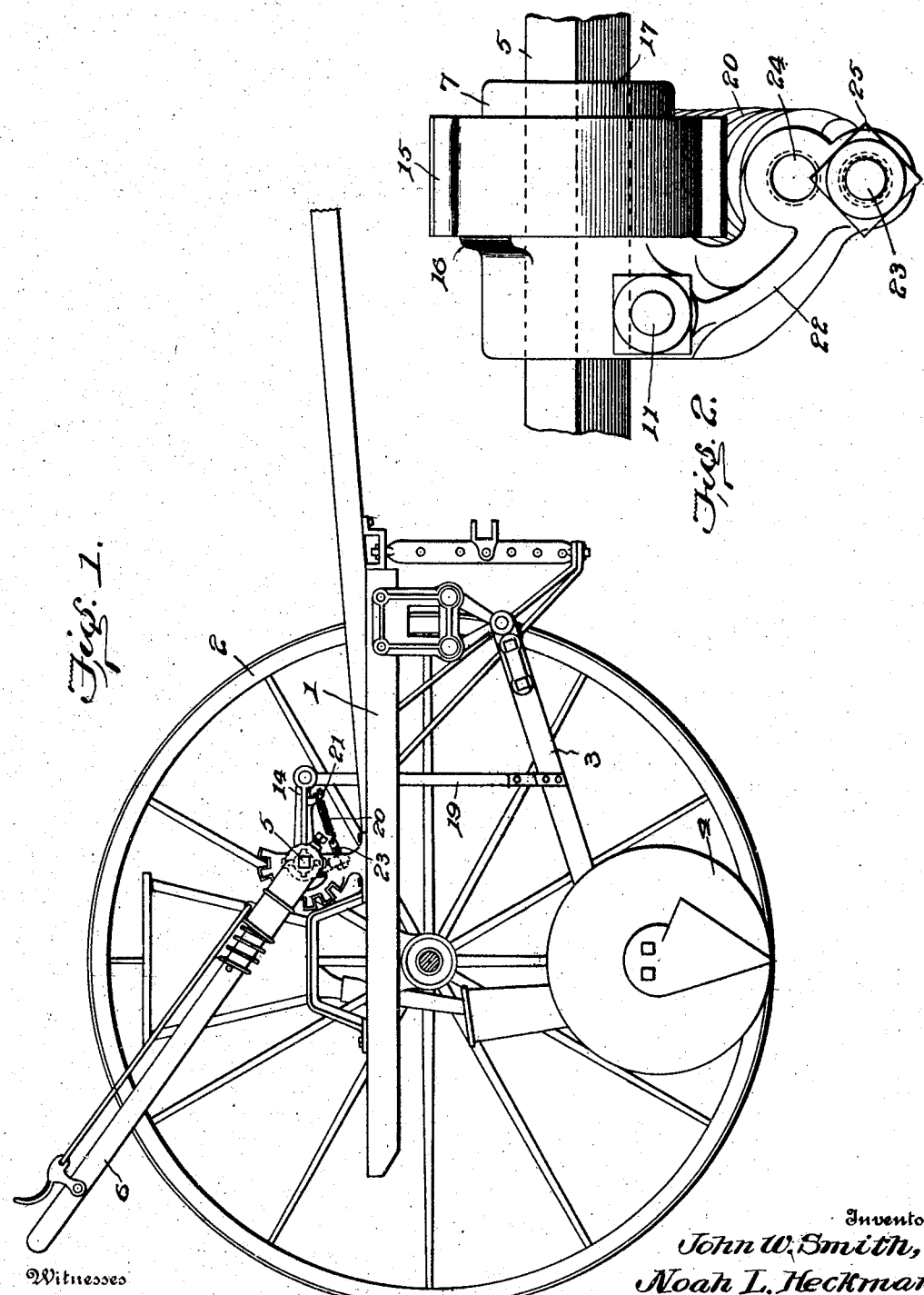

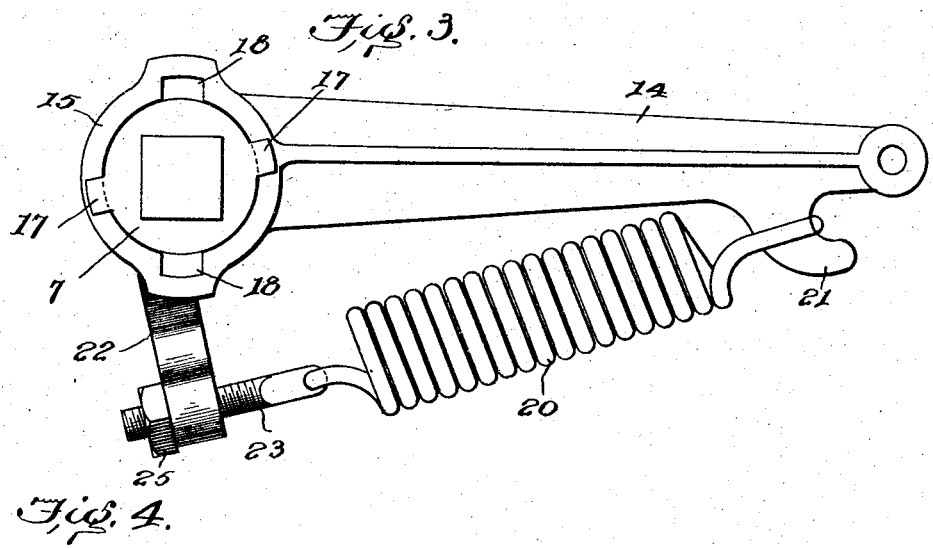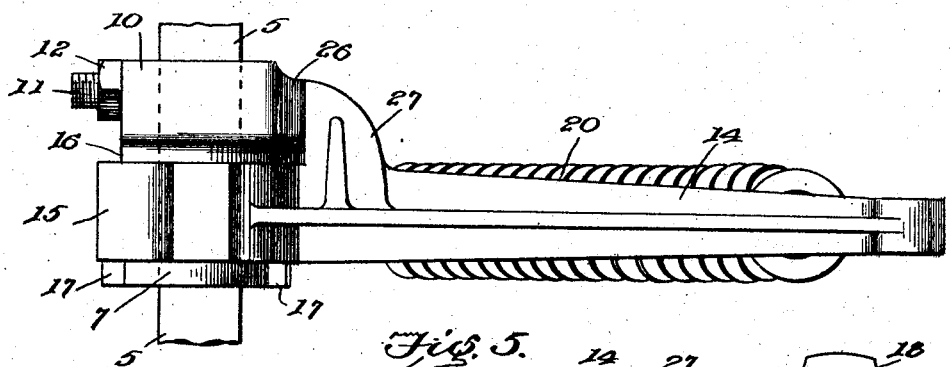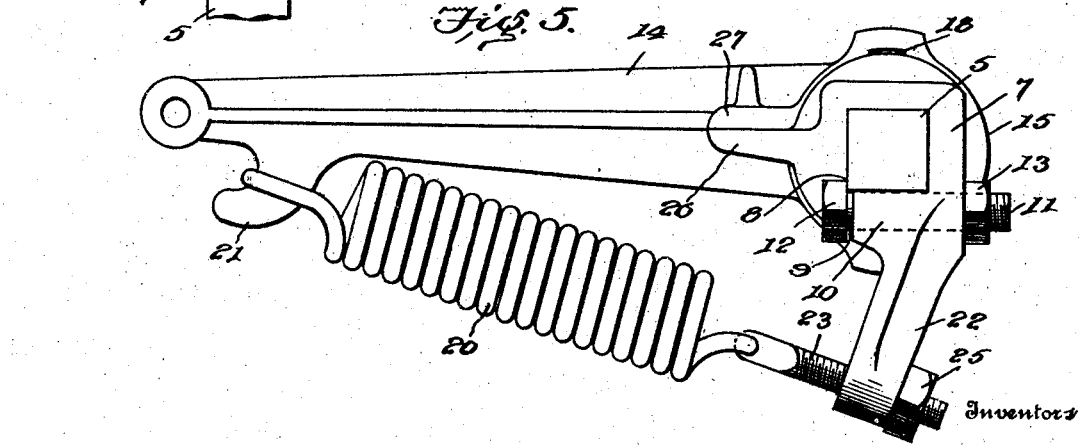

UNITED STATES PATENT OFFICE.

JOHN W. SMITH AND NOAH L. HECKMAN, OF LIBERTY, INDIANA; SAID SMITH ASSIGNOR OF ALL HIS RIGHT AND SAID HECKMAN ASSIGNOR OF ONE-THIRD OF HIS RIGHT TO JUSTICE W. SHARICK, OF SPRINGFIELD, OHIO.

PRESSURE DEVICE FOR GRAIN-DRILLS.

SPECIFICATION forming part of Letters Patent No. 781,375, dated January 31, 1905.

Application filed February 13, 1904. Serial No. 193,373.

*To all whom it may concern:*

Be it known that we, JOHN W. SMITH and NOAH L. HECKMAN, citizens of the United States, residing at Liberty, in the county of Union and State of Indiana, have invented certain new and useful Improvements in Pressure Devices for Grain-Drills, of which the following is a specification, reference being had therein to the accompanying drawings.

This invention relates to pressure devices for grain-drills, and has for its object to provide a simple and efficient mechanism whereby the requisite pressure may be applied to the furrow-opening devices to press them downward into the soil to the desired extent.

The invention also comprises the embodiment of this pressure mechanism as a portion of the mechanism whereby the furrow-opening devices are raised from the ground when not at work and lowered when at work.

The invention consists in certain novel features, which we will now proceed to describe and will then particularly point out in the claims.

In the accompanying drawings, Figure 1 is a side elevation of a grain-drill having our improvements applied thereto, one of the wheels being removed to show the construction. Fig. 2 is a rear elevation of the mechanism constituting the pressure device proper. Fig. 3 is an elevation from one side thereof. Fig. 4 is a plan view, and Fig. 5 is a view in elevation, of the opposite side from that shown in Fig. 3.

In the said drawings we have shown a grain-drill comprising a frame 1, supported on wheels 2 and having drag-bars 3, pivoted at their forward ends and provided at their rear ends with furrow-openers 4, which latter may be of any approved type. On the frame is mounted a rock-shaft 5, preferably square in cross-section, provided with an operating-lever 6, by means of which the rock-shaft is operated to raise and lower the drag-bars, said lever being provided with the usual locking quadrant and pawl. These parts may be of any approved construction.

On the rock-shaft 5 there is mounted a plurality of pressure devices, one for each drag-bar, one of these devices being shown in detail in Figs. 2 to 5, inclusive. It consists of a sleeve 7, mounted on the rock-shaft, preferably by forming through the sleeve an opening in which the rock-shaft fits, such opening being shown as square in cross-section in the present instance. We prefer for the purpose of securing said sleeve in position on the rock-shaft the construction which we have devised to that end and which is shown more particularly in Fig. 5. In this construction the sleeve is cut away at one corner of the rock-shaft, as indicated at 8, to leave an opening through which the rock-shaft is exposed, the faces of the sleeve below the rock-shaft (indicated by the reference-numeral 9) lying back of the corresponding face of the rock-shaft. The sleeve is provided at this point with a transverse tubular housing 10, through which passes a bolt 11, the head 12 of which lies in the cut-away portion of the sleeve and can be drawn against the exposed faces of the rock-shaft by screwing up the nut 13, mounted on the other or rear end of the bolt. The cutting back of the face 10 of the sleeve permits the bolt-head to engage the shaft before it comes into contact with the end of the tubular housing in which it is mounted. This securing device is much more efficient and readily managed than the set-screw usually employed for such purposes and is at the same time less expensive.

The sleeve 7 serves as a means of support and bearing for the pressure-arm, hereinafter referred to, and also as a means for limiting the downward motion of said arm and as a means for supporting one end of the spring by which the pressure-arm is controlled. With respect to the first of these functions, the pressure-arm, which is indicated by the reference-numeral 14, is provided with a hub 15, adapted to fit the sleeve 7, said sleeve being provided about midway of its length with an annular collar 16, against which the hub of the pressure-arm fits when in place, said sleeve limiting its motion in one direction. In order to further secure said hub in position on the sleeve, the bearing portion of the sleeve, extending from the collar 16 toward one end of the sleeve, is provided near its outer end with radial studs or projections 17, while the hub 15 is provided with corresponding longitudinal grooves 18, through which said studs may pass during the operation of placing the hub in position on the sleeve. The sleeve extends beyond the hub when this latter is against the collar 16 to an extent sufficient to cause the projections 17 to lie outside of the outer faces of the hub, so that when the pressure-arm is turned down into operating position it is held in position on the sleeve between the collar 16 on one side and the projections 17 on the other. The arm 14 has its free end connected by a link 19 with the corresponding drag-bar 3, said link being pivoted at its respective ends to the arm and drag-bar and being sufficiently rigid to transmit pressure from the arm to the drag-bar. This pressure is obtained by means of a spring acting on the pressure-arm 14 in such a way as to press the same normally downward. We prefer for this purpose the construction shown, in which a coiled spring 20 is located below the pressure-arm and connected at one end to said arm and at the other end to the shaft 5 through the medium of the sleeve 7. To effect these connections, the pressure-arm 14 is provided on its under side near its free end with a hook projection 21, over which one end of the spring 20 is looped. The sleeve 7 is provided with an arm 22, extending downward therefrom into the same vertical plane as the arm 14, said arm 22 having its lower end adapted to receive a screw-bolt 23, to which the other end of the spring 20 is connected, and which serves to adjust the tension of said spring. To this end said screw-bolt is adapted to pass through any one of a plurality of apertures 24 in the lower end of the arm 22 and to receive a nut 25 at the rear side of said arm, by means of which it is adjusted. The apertures 24 are arranged at different distances from the axis of the shaft 7, so that the position of the attaching device may be adjusted closer to or farther from said shaft, so as to vary the leverage, and consequently the amount of pull exerted on the spring 20 when the shaft is rotated. The sleeve 7 is further provided with a stop projection 26 to limit the downward motion of the arm 14 relatively to said sleeve, and in the present instance we have shown this stop projection as located at one side of the arm, the arm being provided with a corresponding projection 27, in the path of which the projection 26 lies.

The device thus constructed operates in the following manner: When the drag-bars are raised, the rock-shaft 5 is so turned that the stop projection 26 lies under and in contact with the projection 27, which is held against it not only by the pull of the spring 20, but also by the weight of the drag-bar and furrow-opener. When it is desired to force the furrow-openers into the ground, the rock-shaft is turned by throwing the lever 6 forward, thus permitting the arms 14 to move downward until the furrow-openers come into contact with the soil. Further rotation of the rock-shaft in the same direction withdraws the stop projections 26 from the path of the pressure-arms 14 and at the same time exercises an increasing pull upon the springs 20 through their connection with the arms 22, which latter rotate along with the rock-shaft. This action causes the springs 20 to pull the pressure-arms downward with a corresponding degree of force, and through the links 19 and drag-bars 3 this spring-pressure is transmitted to the furrow-openers to force them into the ground. The pressure is controlled, in the first place, by the extent to which the rock-shaft is rotated. It is further controlled by the adjustment of the tension of the spring 20 through the medium of the bolt 23 and its nut 25. It is still further controlled by the adjustment of the point of attachment of one end of the spring toward or from the center of movement of the parts— to wit, the axis of the rock-shaft. These latter two controlling elements may be readily adjusted independently of each other, so that the desired pressure for any given position of the operating-lever may be readily regulated. The pressure on all of the drag-bars may be readily adjusted by shifting the bolts 23 from one set of holes 24 to any other set, while the pressure on the individual drag-bars may be equalized by separately adjusting the tension of each spring 20 by means of its nut 25 and bolt 23. While the furrow-openers are thus held to their work by spring-pressure, any one or more of them may yield upward independently upon meeting an obstacle, or be depressed independently, so as to follow the inequalities of the soil, since the several pressure-arms 14 are free to move independently of each other and of the shaft on which they are mounted. The drag-bars may be readily lifted to raise the furrow-openers clear of the soil by moving the lever 6 back into the position shown, thereby rotating the rock-shaft in the opposite direction and bringing the stop projections 26 into contact with the pressure-arms and positively lifting them, thereby also positively lifting the drag-bars and furrow-openers.

It is obvious that modification in the details of construction hereinbefore described, and shown in the accompanying drawings, may be made without departing from the principle of our invention. For instance, our invention is not limited to the employment of a spring under tension for the purpose of actuating the pressure-arms nor to the location of the operating-spring below said arms, nor is the interposition of a sleeve between the arm and rock-shaft an essential feature of our invention in its broadest form.

Various other modifications will readily suggest themselves, and we do not, therefore, wish to be understood as limiting ourselves to the precise details set forth.

Having thus fully described our invention, what we claim as new, and desire to secure by Letters Patent, is—

1. In a grain-drill, the combination, with a frame, and a drag-bar pivoted thereto at its forward end and having furrow-opening devices at its rear end, of a rigid pressure-arm pivotally connected with the frame, its pivotal axis being fixed relatively to said frame, a link connecting said pressure-arms and drag-bar, and a spring acting on said arm to press the same downward, substantially as described.

2. In a grain-drill, the combination, with a frame, and independent drag-bars pivoted thereto at their forward ends and carrying furrow-opening devices at their rear ends, of a rock-shaft mounted on the frame and provided with operating and locking means, rigid pressure-arms, one for each drag-bar, independently pivoted on said rock-shaft so as to rock around the same, springs connecting each arm to the rock-shaft, links connecting the arms to their respective drag-bars, and means on the rock-shaft for positively engaging and lifting the arms, substantially as described.

3. In a grain-drill, the combination, with a frame, and drag-bars pivoted thereto and carrying furrow-opening devices, of rigid pressure-arms pivotally mounted on the frame, their pivotal axes being fixed relatively to said frame, links connecting said arms and the drag-bars, a rock-shaft mounted in the frame, means for operating and locking said rock-shaft, springs connecting said arms and rock-shaft whereby, when the rock-shaft is rotated in one direction, the said movement is transmitted through the springs to the pressure-arms to move them downward, and means carried by said rock-shaft to engage the pressure-arms when the rock-shaft is rotated in the other direction, to positively lift said arms, substantially as described.

4. In a grain-drill, the combination, with a frame, and drag-bars pivoted thereto and carrying furrow-openers, of a rock-shaft mounted in the frame and provided with means for operating and locking the same, sleeves secured on said rock-shaft and provided with stop projections and with spring-attaching arms, pressure-arms pivotally mounted on said sleeves in the path of said stop projections, springs extending from said pressure-arms to said spring-acting arms, and links connecting said pressure-arms and drag-bars, substantially as described.

5. In a pressure device of the character described, the combination, with a rock-shaft, and a pressure-arm pivotally mounted thereon, of a spring connected to said arm and rock-shaft, the connection of one end of said spring being adjustable toward and from the axis of the rock-shaft, substantially as described.

6. In a pressure device of the character described, a rock-shaft, rigid pressure-arm pivotally mounted thereon, a spring connected to said arm and rock-shaft, and means for varying the tension of the spring, substantially as described.

7. In a pressure device of the character described, a rock-shaft, a pressure-arm pivotally mounted thereon, a spring connected to said arm and rock-shaft, and means for varying the tension of the spring, and for adjusting its connection at one end toward and from the center of the rock-shaft, substantially as described.

8. In a pressure device of the character described, the combination, with a rock-shaft, of a sleeve secured thereon and having a bearing portion provided with a collar at one end and with projections at the other end, and a pressure-arm having a hub adapted to fit on said sleeve between said collar and projections, and having grooves for the passage of said projections, substantially as described.

9. In a pressure device of the character described, the combination, with a rock-shaft, of a sleeve secured thereon and having a spring-attaching arm provided with a plurality of apertures located at different distances from the shaft-center, a pressure-arm pivotally mounted on said sleeve, and a spring connected at one end to said arm and provided at its other end with means for connecting it to any one of the apertures of the sleeve-arm, substantially as described.

10. In a pressure device of the character described, the combination, with a rock-shaft, of a sleeve secured thereon and having a stop projection and a spring-attaching arm, a pressure-arm pivoted on said sleeve and having a part lying in the path of the stop projection, and a spring connected to the pressure-arm and to the spring-attaching arm, substantially as described.

11. In a pressure device of the character described, the combination, with a rock-shaft having a plane face, of a bearing-sleeve mounted thereon and cut away so as to expose said face, and a clamping-bolt passing through said sleeve and having its head engaging the exposed face of the rock-shaft, substantially as described.

In testimony whereof we affix our signatures in presence of two witnesses.

JOHN W. SMITH.
NOAH L. HECKMAN.

Witnesses:
J. DAVIS,
A. B. GILMORE.